Sept. 4, 1962     R. W. PARKER     3,052,477
DUST COVERS FOR BALL JOINTS
Filed Aug. 24, 1960
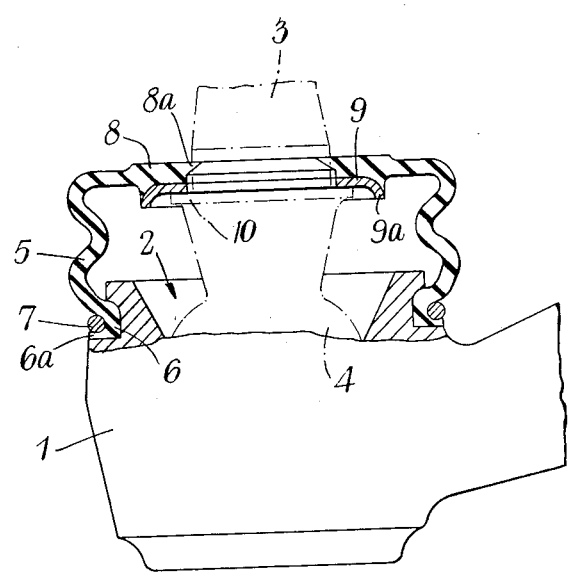

3,052,477
DUST COVERS FOR BALL JOINTS
Robert William Parker, Clevedon, England, assignor to Engineering Productions (Clevedon) Limited, Clevedon, England, a company of Great Britain
Filed Aug. 24, 1960, Ser. No. 51,653
Claims priority, application Great Britain Dec. 30, 1959
5 Claims. (Cl. 277—189)

This invention relates to dust covers for ball joints and is concerned with generally improving the efficiency and wearing properties of such covers.

Accordingly the invention provides, for use on a ball joint having a ball housing with an open mouth through which a ball pin projects, a dust cover comprising a flexible sealing sleeve having one open end attachable around the housing mouth and the other open end defined by an annular sealing lip dimensioned to make wiping contact around the ball pin, or around a member coupled thereto, a rigid annular washer being bonded around said lip inside the cover to locate and support the lip when operatively positioned.

In order that the invention may be clearly understood and readily carried into effect, an embodiment thereof will now be described in detail with reference to the accompanying drawing which shows, in part-sectional side elevation, a dust cover of the invention fitted to one form of ball joint.

Referring now to the drawing, the ball joint illustrated has the usual ball housing 1 with an open mouth 2 through which a ball pin 3 projects from a ball 4 mounted in the housing. A dust cover, in the form of a flexible sleeve 5, is provided to prevent the ingress of dust or dirt into the housing through the open mouth 2 thereof, and for retaining lubricant present in the joint. The sleeve 5 may be of rubber or any appropriate flexible synthetic material and conveniently has a wall of corrugated or concertina form as shown. Alternatively, the sleeve wall may be plain.

The sleeve is shaped to have one end opening somewhat larger than the other, the larger opening being defined by a neck 6 which may have an outwardly extending rim flange 6a. This neck is then arranged to seat around the outside of the housing mouth 2, and is conveniently gripped by an encompassing circlip 7 or the like seating in a channel formed around the outside of the sleeve neck 6.

The end of the sleeve having the smaller opening is inturned and thickened somewhat to form an annular lip 8 around this opening, the inner peripheral edge of the lip being dimensioned to make wiping contact around the ball pin 3, or around a member coupled thereto. This inner peripheral lip edge is preferably also shaped to converge inwardly around the outer margin as shown at 8a. Bonded or otherwise permanently attached to the inside face of the lip is a rigid washer 9 of annular dished form. This washer 9 may be made of metal or other appropriate material and, due to the dished shaping, has an edge flange 9a which extends inwardly of the sleeve from the lipped end of the latter. Alternatively, washer 9 can be made in flat form.

The washer 9 forms a unitary structure with the sleeve and serves both to locate the lipped sleeve end in its operative position around the ball pin, or member connected thereto, and also to support the lip 8 in a manner which prevents the smaller sleeve opening becoming enlarged or distorting when the ball pin rocks relatively to the ball housing. For the purpose of locating the lipped sleeve end, the washer 9 may be arranged, as shown, to bear on a shoulder 10 formed around the ball pin 3.

The dust cover as described is, of course, applicable to other types of ball joint, the sleeve end having the larger opening being attached or sealed to the joint housing in any appropriate manner and the lipped sleeve end being appropriately shaped to ensure wiping contact.

I claim:
1. For use on a ball joint having a ball housing with an open mouth through which a shouldered ball pin rockably and rotatably projects, a dust cover assembly comprising
   (a) a flexible open ended sealing sleeve, having
   (b) a neck at one open end for making sealing contact with the housing around the said mouth and
   (c) an inturned thickened sealing lip at the opposite end with an inner peripheral edge which converges inwardly around the outer margin to make wiping contact with said projecting ball pin outwardly of said shoulder, and
   (d) a rigid annular washer bonded around the inside of said lip for seating on said shoulder to locate and support said lip and to maintain said convergent lip edge in wiping contact with said ball pin.

2. For use on a ball joint having a ball housing with an open mouth through which a shouldered ball pin rockably and rotatably projects, a dust cover assembly comprising
   (a) a flexible open-ended sealing sleeve having
   (b) a neck at one open end, for making sealing contact with the housing around the said mouth, and
   (c) an inturned thickened sealing lip at the opposite end, for encircling said projecting ball pin outwardly of said shoulder, and
   (d) a rigid annular support washer bonded around the inside of said lip for seating on said shoulder,
   (e) said lip having an inner peripheral edge which converges inwardly around the outer margin to overhang said washer and make wiping contact around said ball pin.

3. For use on a ball joint having a ball housing with an open mouth through which a shouldered ball pin rockably and rotatably projects, a dust cover assembly comprising
   (a) a flexible open ended sealing sleeve, having
   (b) a neck at one open end for making sealing contact with the housing around the said mouth,
   (c) flexible means at the opposite ends of the sleeve for making wiping sealing contact with the projecting ball pin, and
   (d) rigid means on said sleeve for seating on the shoulder of the pin for preventing bodily movement of the flexible means out of wiping sealing contact with the pin but permitting local displacement of the flexible means so that the flexible means can accommodate itself to the movements of the pin without interrupting the wiping sealing engagement of the flexible means with the pin.

4. A dust cover assembly as claimed in claim 3 wherein,
   (e) said flexible means engages the pin at an area which is radially inward and axially outward of the area at which the rigid means contacts the pin.

5. A dust cover as claimed in claim 1, wherein the rigid annular washer has a dished form to provide an edge flange which projects inwardly of the sleeve from the lipped end of the latter.

References Cited in the file of this patent
UNITED STATES PATENTS

| | | |
|---|---|---|
| 2,305,265 | LeTourneau | Dec. 15, 1942 |
| 2,593,253 | Booth | Apr. 15, 1952 |
| 2,641,492 | Flumerfelt | June 9, 1953 |

FOREIGN PATENTS

| | | |
|---|---|---|
| 857,714 | Germany | Dec. 1, 1952 |